United States Patent [19]

Robinson et al.

[11] Patent Number: 4,746,998
[45] Date of Patent: May 24, 1988

[54] METHOD FOR MAPPING AROUND DEFECTIVE SECTORS IN A DISC DRIVE

[75] Inventors: Don M. Robinson, Santa Clara County; Henry E. Davenport, Santa Cruz County, both of Calif.

[73] Assignee: Seagate Technology, Inc., Scotts Valley, Calif.

[21] Appl. No.: 800,062

[22] Filed: Nov. 20, 1985

[51] Int. Cl.[4] .......................... G11B 15/18; G11B 5/09
[52] U.S. Cl. ....................................... 360/72.1; 360/49
[58] Field of Search ................... 360/49, 31, 72.1, 60, 360/53

[56] References Cited

U.S. PATENT DOCUMENTS

| 4,214,280 | 7/1980 | Halhfill et al. | 360/53 |
| 4,405,952 | 9/1983 | Slakmon | 360/49 |
| 4,558,446 | 12/1985 | Banba et al. | 360/53 |

Primary Examiner—Vincent P. Canney
Attorney, Agent, or Firm—Flehr, Hohbach, Test, Albritton & Herbert

[57] ABSTRACT

The defect list, as supplied by the manufacturer, is stored on the outer tracks of the disc. It is merged with the user-supplied media defect list during formatting and used to flag defective sectors. During initialization the merged defect list is loaded into a section of dynamic memory so that it is accessible during seeking of a particular address.

7 Claims, 3 Drawing Sheets

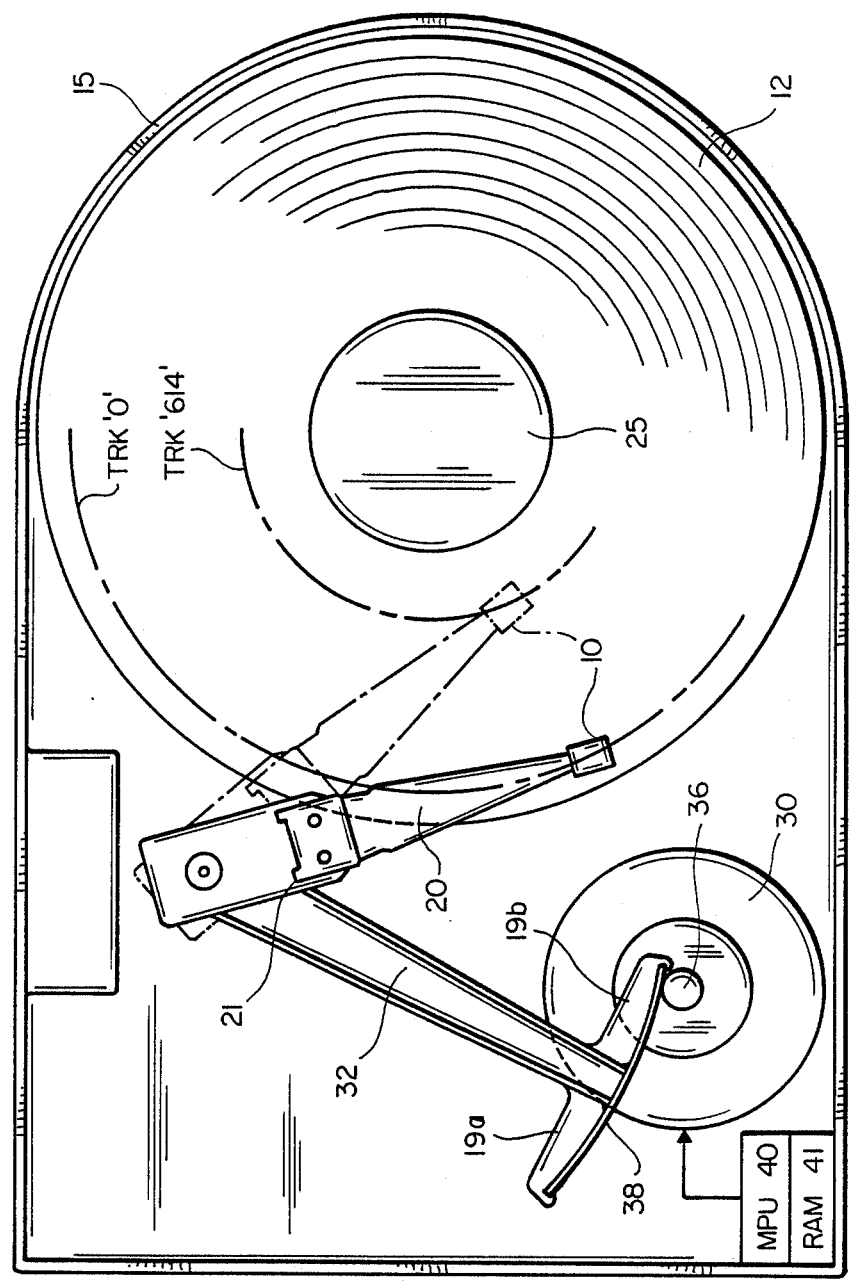
FIG_1

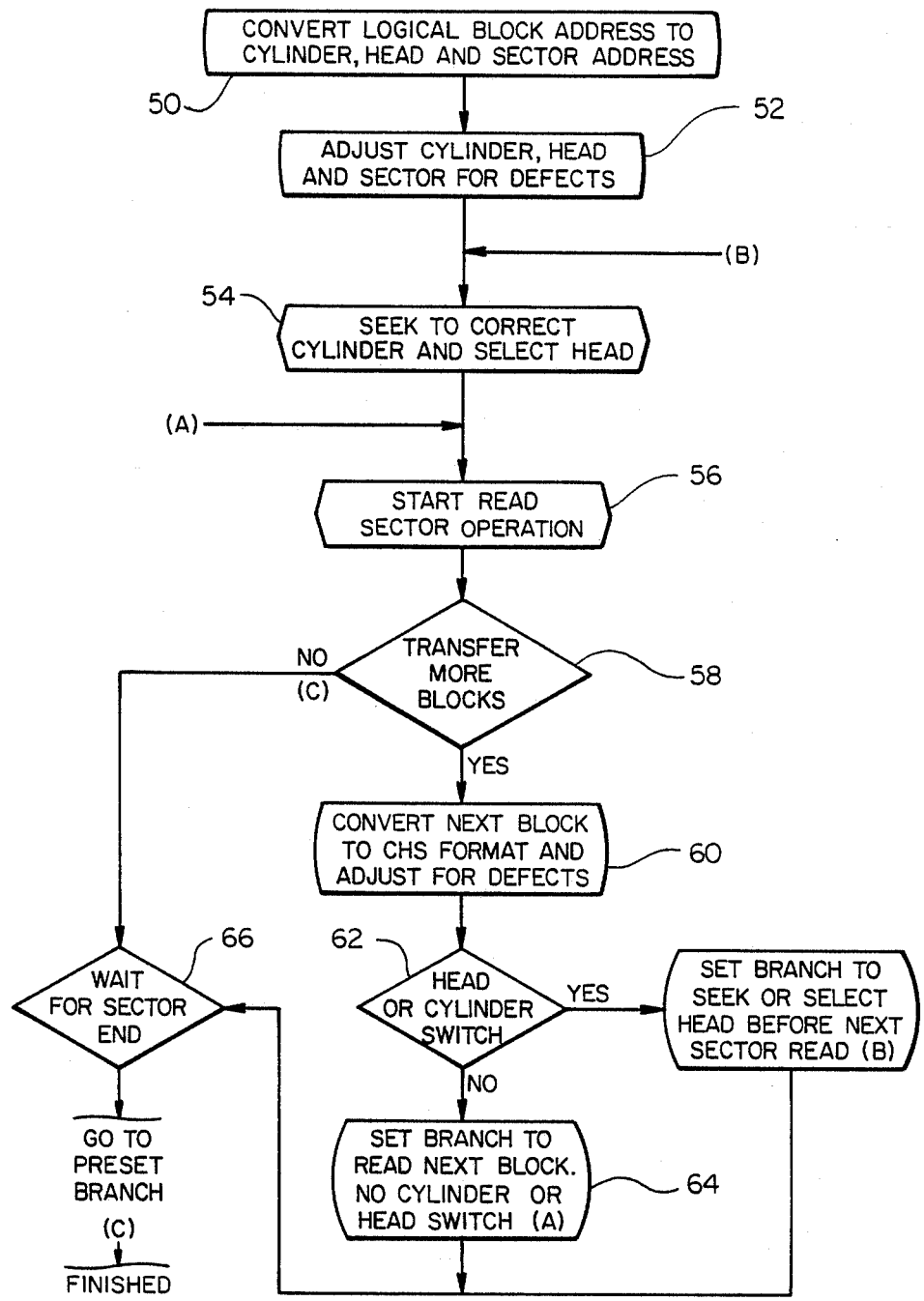
FIG_2

DEFECT MANAGEMENT BY SECTOR SLIP

CYLINDER 0      HEAD 3

| 51 | 52 | 53 | 54 | 55 | 56 | 57 | 58 | 59 | 60 | 61 | 62 | 63 | 64 | 65 | 66 |

DEFECTIVE SECTOR

CYLINDER 1      HEAD 0

| 67 | 68 | 69 | 70 | 71 | 72 | 73 | 74 | 75 | 76 | 77 | 78 | 79 | 80 | 81 | 82 | 83 |

FIG_3

METHOD FOR MAPPING AROUND DEFECTIVE SECTORS IN A DISC DRIVE

This invention relates generally to magnetic disc memory apparatus and more particularly to means for improving performance of a disc drive by improved defect management.

Disc drive systems record and reproduce information stored on concentric circular tracks recorded on magnetic discs. The tracks are written and read by a magnetic transducer which cooperates with the surface of the disc. The transducer is positioned over a selected track or cylinder on the disc by an actuator mechanism. Detailed disclosure of disc drive machines and especially a typical linear actuator for positioning the transducers in alignment with a selected cylinder or track on the surface of a disc is found in U.S. Pat. No. 4,323,939; a rotary actuator incorporating a stepper motor for positioning a transducer is found in U.S. application Ser. No. 613,163 filed May 23, 1984. Both are incorporated herein by reference.

Disc drives, especially the positioning devices, are microprocessor controlled. The microprograms typically provided for disc drive controllers are required to meet strict customer and IO interface requirements. The interface requirements and the size of the programs require long development and test cycles before the programs can be committed to ROM or EPROM for production. Once the commitment has been made to put a program in ROM, it is difficult to correct any problems. Thus, products that are manufactured in high volume, with microprograms stored in ROM memory, have high cost per engineering changes which affect the ROMs, i.e., require scrapping the ROMs which have been previously manufactured.

Further, ROM/EPROM based products are difficult to customize for specific customer requirements, as each modification to the program requires a new ROM or EPROM.

Another major problem with storing all the control information for a disc drive in ROM, is that manufacturing testing of such a product is difficult as all the test programs must be held within the ROM. Further, it makes defect management difficult and inefficient.

It is an objective of this invention to provide an improved means for storing some of the controlling operating data in a microprocessor controlled disc drive.

Another objective of this invention is to improve the performance and reliability of rotating disc data storage devices while reducing its complexity and cost of manufacture.

Further discussion of the present invention will include the following terms, which are defined as follows:

Format—a defined specification of the manner in which data is organized in a disc drive;

Track—any one of a multiplicity of concentric circular paths on one surface of one disc which is used for storing data;

Cylinder—a set of tracks, as defined above, which are located at the same relative position on multiple surfaces of the same disc or multiple discs and simultaneously accessed by an array of read/write heads which are moved together by the disc drive actuator means;

Sector—a portion of a track whose size and number are determined by the format specified.

Yet another objective of this invention is to provide a more efficient approach to defect management. More specifically, in some older disc drive systems, any defective block on a track will cause the entire track to be flagged as defective. This results in a considerable loss in capacity since the remainder of the track would still be useable.

It is an objective of this invention to bypass defects at a sector level rather than at a track level.

Yet another objective of this invention is to provide a rotating disc data storage device with internal means for dynamically storing a defect list at a sector level to enhance maintenance and adjustment of the device.

Another objective of this invention is to provide a means for storing a data list which may be comprised of both the manufacturer-generated media defect list and a user-supplied media defect list. Such storage of a manufacturer's media defect list in dynamic memory will allow it to be generated by special test equipment, saved on disc in a specially protected area, and accessed by the controller to directly bypass defects without unnecessary seeking steps. Such defect management approach also allows for a user-supplied media defect list which may be added to the manufacturer's media defect list, saved on the disc for future format operations and if necessary removed on command.

These and other objectives of this invention are achieved in a disc drive wherein selected non-user-accessible tracks of the disc are used to store the media defect information. This information can be read from these tracks of the disc during initialization of the disc drive.

In a specific embodiment of the present invention, the defect list is stored as supplied by the manufacturer on outer tracks of the disc. It is merged with the user-supplied media defect list during formatting, and used during formatting to flag defective sectors. During initialization of the disc drive, this merged media defect list is loaded into a section of dynamic memory so that it is quickly accessible during seeking of a particular address.

Thus, when a seek command is received, the media defect list can be accessed, and the positioning command is modified to avoid accessing of a defective block, instead directly accessing the next fully effective block.

This invention can be better understood by reference to the following figures:

FIG. 1 is a plan view of a disc drive with which this invention is useful;

FIG. 2 is a flow diagram of the sequence of steps to be followed in addressing a particular sector on a disc drive track;

FIG. 3 illustrates an example arrangement of particular cylinders, heads and sectors on a disc drive as shown in FIG. 1.

The typical disc drive as shown in FIG. 1 includes a plurality of discs 12 stacked on a hub 25 for rotation by a spindle motor. A transducer 10 is positioned over any of the tracks for reading or writing data on the selected track. The positioning occurs under control of a stepper motor 30 in response to commands from a microprocessor 40. Rotation of the stepper motor 30 and its shaft pulley 36 causes a flexible band 38 which is connected to the head 19 of arm 32 to wind and unwind on the stepper motor shaft pulley 36, moving the arm 21 and associated transducer 10 to the selected track. The following format information will be used as an example and will be referred to in the explanation below: 615 cylinders (numbered 0–614), 4 heads (tracks per cylinder) (numbered 0-3), 17 sectors per track (numbered 0-16), 512 data bytes per sector, 41,820 sectors per head (numbered 0-41819).

In addition, the drive has two additional cylinders identified as −1 and −2 cylinders, with four tracks each, formatted 256 bytes per sector, 32 sectors per track and with a 1 to 1 interleave factor.

The objective of this invention is to minimize the time spent in mechanically seeking for the correct track. Such improper seeking can occur if the original seek is carried out to a block or track which is in fact defective.

Such disc media defects fall into two categories. One category comprises defects identified by the manufacturer during the course of manufacturing testing, using stress enlarging techniques. These defects are supplied in a list in cylinder, head, and bytes from index formats. An example of the numbering scheme appears in FIG. 3. A separate head or transducer 10 reads and writes the data on each disc surface. Therefore, a particular location in any disc surface may be identified by defining the cylinder and the head number (these two together combining to identify a particular track on a particular disc surface) followed by identifying a particular sector.

Other defects which must be taken into account are those identified by the user over a period of time. These defects are supplied in a list in logical block address format. The defect information may be stored on a disc drive for ready access in the disc drive on tracks −1 and −2 identified above outside the user-accessible data area.

In order to make best use of the defect list, the following steps are taken. First the manufacturer's defect list is converted into a physical cylinder, head, sector format to make up the known defect list.

Secondly, the defective sectors are flagged so that they are functionally bypassed.

Thirdly, a method is provided for the user to add defects to the known defect list using logical block address format. (It is well known in the disc drive field to convert logical block addresses into cylinder, head and sector addresses as most seek commands are initially input as logical block addresses.)

Fourth, the added defects are converted to physical cylinder, head sector format, taking into account previous defects and the interleave factor in the discs.

Fifth, the added defects are merged into the known defect list.

And finally, the logical block address is translated into cylinder, head and sector addresses and adjusted for defects to avoid performance degradation during seek.

Considering these steps in detail, the first step is the conversion of the manufacturer's media defect list from the recorded tracks on the discs into a physical cylinder, head, sector format. This becomes the known defect list. This is accomplished by taking the entry in the manufacturer's list and plugging cylinder and head into the known defect list and looking at the sector defect map to find the sector number or numbers that contain a comparable range for the bytes from index number. When a sector number match is found, that number is added as an entry into the known defect list. The last number in the known defect list is a relative defect in the list with the first entry being 1, the second entry 2, the third entry 3, and so on. All of this technique is well known in this technology.

The entries in the sector defect map overlap to account for gaps and speed variations, so it is possible for one manufacturer's defect entry to become two entries in the known defect list. Basically, the objective is to provide a list of defects defined in terms of cylinder head and sector on the disc of a particular disc drive.

Next, the defective sectors are flagged so that they are functionally bypassed. During Format Unit operation, the disc is incrementally formatted a track at a time, starting at cylinder 0, track 0, to cylinder 614, track 3. The first sector on cylinder 0 track 0 is formatted as logical block 0. The logical block address is incremented across the entire disc and not reset to 0 on track or cylinder boundaries. Before formatting each track, a table with an entry for each physical sector on the track is generated. Referencing the known defect list, any defective sectors are marked defective. The remaining sectors are numbered taking into account the interleave factor. The defective sector does not get a logical block address and does not cause a logical block address to be skipped. It merely means one less logical block for each defect encountered. Thus, this step is basically an extension of known formatting and sector addressing techniques, with the only modification being in the numbering scheme to take into account the defects which have been identified so that they are not given addresses and are not addressed in response to any data access command.

Next, the user can add defects to the known defect list using logical block address format, simply by using the standard manual format commands which are well known in the disc drive industry.

Next, the added defects are converted to cylinder head and sector format taking into account previous defects and the interleave factor. Thus, these are simply eliminated as possible addresses for data storage so that they are not accessed.

Next, the added defects are merged with the known defect list into a scratch pad area, in the microprocessor 40, then copied back into the known defect list so that a single merged list is generated.

Now, when a read command which includes a logical block address is received, it is converted into a cylinder, head and sector address and adjusted for defects to avoid performance degradation during seek time. In order to accomplish this, when the disc drive 15 is powered on, the known defect list is loaded into a RAM 41 which is part of MPU 40. (In this way, when new defects are added by a format command by the user, the new known defect list is written back to the −2 cylinder so that the latest updated defect list is always available to upload at power on time and during operation is always available in the RAM 41.)

Read/write and seek commands are presented in logical block format to the microprocessor 40. In order to correctly position the actuator 32, and select the correct head 10, the logical block address is converted to target cylinder, head and sector address at step 50 of FIG. 2. This alone would be enough information to correctly position the actuator head and select the correct head if there were no defects. The average seek time in an example disc drive for such an operation is 65 milliseconds, with track-to-track seek time being 20 milliseconds. Because the known defect list is available in RAM at all times, the computed cylinder head and sector can be accurately corrected for defects as shown in the following steps in approximately 70 microseconds, thus avoiding a 20 ms to 65 ms seek to wrong track and a subsequent 20 ms to 65 ms reseek to the correct track. Thus simply by converting the incoming block address to cylinder, head and sector address, and adjusting for defects, at 52, a seek to correct cylinder and head is immediately achieved.

For example, looking at the defective sector shown in FIG. 3, without the benefits of this invention, a command to read sector 67 would have initially required a seek to cylinder 0 but because the defective sector 67 is now on cylinder 1, a reseek with the necessary time to carry out this reseek would have had to occur. Instead, an automatic adjustment is made to the correct seek address with no loss in performance.

Thus following step 52, a seek to the correct cylinder and head position is immediately carried out and a read operation conducted at 56. If more blocks are to be transferred as shown at the decision block 58, the next block is converted to cylinder, head, sector format at step 60; the necessary cylinder or head switch is carried out at step 62; and a branch is carried out to select the correct head. Then the program returns to step 54 to cause the actuator to seek the correct track address. If no cylinder or head switch is required at step 62, the next block is immediately read at step 64 followed by a return to the command to wait for the end of the sector at 66 and then branching to the finish of the program.

In summary, by providing for an adjustment for defects immediately upon receipt of a block address from a user as part of a seek command, considerable time is saved and performance is enhanced.

Alternatives to the present invention may become apparent to a person of skill in the art who studies this invention disclosure. Therefore, the scope of the present invention is to be limited by the claims which follow.

What is claimed:

1. In a disc drive with at least one disc, a transducer for reading and writing data on said disc, and means for positioning said transducer relative to said disc, said positioning means being responsive to position commands to position said head relative to said disc, the improvement comprising means for storing a list of defective tracks and blocks on tracks of said disc outside the user accessible list of tracks, means for accessing said list and means for modifying said positioning commands by said stored list to access tracks on said disc.

2. Disc drive as in claim 1 wherein each of said positioning commands comprises a logical block address stored on one of said normally inaccessible tracks, said positioning means comprising means for modifying said logical block address to a cylinder, head and sector address, said modifying means including means for adjusting said cylinder head and sector address in response to said defect list.

3. A method of adjusting for defective sectors in a disc drive comprising at least one disc having a plurality of data storage tracks wherein each disc storage sector on said disc is uniquely addressed by cylinder, head and sector number,
comprising the steps of storing a list of defective sectors on a track of said disc outside the range of normally usable tracks,
receiving a logical block address for a block to be accessed,
converting said logical block address to a cylinder, head and sector,
accessing said defect list on said normally unused track,
modifying said cylinder, head and sector address according to said defect list, and
seeking said modified address.

4. A method as claimed in claim 3 including the step of transferring the stored defect list from said disc track to controller accessible memory in said disc drive.

5. A method as claimed in claim 3 including the step of storing said defect list on a disc drive track in a cylinder, head, sector format.

6. A method as in claim 4 including the step of supplying a list of added defective sectors to said controller,
merging said list of added defective sectors with said stored defect list into a single merged list, and
storing said merged list on tracks outside the list of normally accessible tracks.

7. A method of adjusting for defective sectors in a disc drive comprising at least one disc having a plurality of data storage tracks wherein each disc storage sector on said disc is uniquely addressed by cylinder, head and sector number, comprising the steps of
storing a list of said defective sectors and said other parameters on a track of said disc,
receiving a logical block address for a block to be accessed,
converting said logical block address to a cylinder, head and sector,
accessing said defect list,
establishing positioning commands comprising said cylinder, head and sector address as modified by said defect list, and
seeking said head to said modified address.

* * * * *